United States Patent
Addink et al.

(10) Patent No.: US 7,317,972 B2
(45) Date of Patent: Jan. 8, 2008

(54) MANAGEMENT OF PEAK WATER USE

(75) Inventors: John W. Addink, Riverside, CA (US); Sylvan Addink, Riverside, CA (US)

(73) Assignee: Aqua Conserve, Inc., Riverside, CA (US)

( * ) Notice: Subject to any disclaimer, the term of this patent is extended or adjusted under 35 U.S.C. 154(b) by 950 days.

(21) Appl. No.: 10/343,349

(22) PCT Filed: Oct. 31, 2001

(86) PCT No.: PCT/US01/45252

§ 371 (c)(1),
(2), (4) Date: Apr. 25, 2003

(87) PCT Pub. No.: WO03/038539

PCT Pub. Date: May 8, 2003

(65) Prior Publication Data

US 2004/0078092 A1    Apr. 22, 2004

(51) Int. Cl.
*G05B 15/02* (2006.01)
*G05D 7/00* (2006.01)
*G05D 11/00* (2006.01)
*F16K 17/36* (2006.01)
*A01G 27/00* (2006.01)
*B05B 1/08* (2006.01)

(52) U.S. Cl. .................. 700/284; 700/9; 137/78.2; 239/69; 239/70; 239/99

(58) Field of Classification Search .............. 700/284, 700/9; 137/624.11, 78.2; 239/69–70, 99
See application file for complete search history.

(56) References Cited

U.S. PATENT DOCUMENTS

| | | | | |
|---|---|---|---|---|
| 3,834,230 A | * | 9/1974 | Auerbach | 73/199 |
| 5,023,787 A | * | 6/1991 | Evelyn-Veere | 700/284 |
| 5,097,861 A | * | 3/1992 | Hopkins et al. | 137/78.3 |
| 5,208,855 A | * | 5/1993 | Marian | 239/69 |
| 5,229,937 A | * | 7/1993 | Evelyn-Veere | 700/284 |
| 5,479,339 A | * | 12/1995 | Miller | 700/16 |
| 5,696,671 A | * | 12/1997 | Oliver | 700/284 |
| 5,870,302 A | * | 2/1999 | Oliver | 700/11 |
| 6,102,061 A | * | 8/2000 | Addink | 137/1 |
| 6,267,298 B1 | | 7/2001 | Campbell | 239/70 |
| 6,298,285 B1 | | 10/2001 | Addink et al. | 700/284 |
| 6,314,340 B1 | | 11/2001 | Mecham et al. | 700/284 |
| 6,453,216 B1 | * | 9/2002 | McCabe et al. | 700/284 |
| 6,823,239 B2 | * | 11/2004 | Sieminski | 700/284 |
| 6,944,523 B2 | * | 9/2005 | Addink et al. | 700/284 |
| 7,058,478 B2 | * | 6/2006 | Alexanian | 700/284 |
| 7,266,428 B2 | * | 9/2007 | Alexanian | 700/284 |
| 2002/0014539 A1 | * | 2/2002 | Pagano et al. | 239/1 |
| 2003/0178070 A1 | * | 9/2003 | Glicken | 137/624.11 |
| 2003/0179102 A1 | * | 9/2003 | Barnes | 340/870.07 |
| 2004/0181315 A1 | * | 9/2004 | Cardinal et al. | 700/284 |
| 2005/0154498 A1 | * | 7/2005 | Townsend | 700/284 |

* cited by examiner

*Primary Examiner*—Ronald Hartman, Jr.
(74) *Attorney, Agent, or Firm*—Fish & Associates, PC

(57) ABSTRACT

The present invention provides systems and methods in which an irrigation management system reduces high peak water use values by utilizing a microprocessor (220) disposed in an irrigation controller (100) to receive peak water use information from a water supplier receive water use information at a consumer site and automatically derive a new irrigation schedule that is at least partly based on the information received. The new irrigation schedule, derived by the microprocessor (220), may include a modification in a default irrigation frequency, a modification in a default irrigation start time(s), a reduction in a default irrigation application duration, the use of a rolling-average in the determination of the new irrigation application duration and other changes or modifications to the default irrigation schedule that will provide for the reduction in high peak water use values. Additionally, the microprocessor will display to the water user and/or third parties details on the new irrigation schedule and information received from the water supplier.

17 Claims, 3 Drawing Sheets

MANAGEMENT OF PEAK WATER USE

FIELD OF THE INVENTION

The field of the invention is water management.

BACKGROUND OF THE INVENTION

Municipalities, water districts, and other agencies that supply water to consumers sometimes regulate the distribution of water because they have an insufficient supply of water to meet consumer demand, maintain water reserves for fire control, etc. Although, insufficient water supplies may occur anytime during the year, they generally occur during the summer and especially during periods of extended drought that frequently result in low water reserves and higher than normal water demands for irrigation. The primary method used to regulate water distribution is through the use of restrictions on the use of water for irrigation or restricting other outdoor water use, such as, hosing the driveways and washing cars. Restrictions on irrigation include requiring consumers to irrigate only on odd days or even days, irrigate only two times a week instead of daily, and so forth. Various means are used to obtain the irrigation users compliance with the restrictions and may include fines, conservation pricing, education, etc.

As mentioned above, these restrictions are usually imposed when there are extended periods of drought. However, restrictions have been imposed on irrigation applications when there is high usage of water on specific days and even intra-day high water use. For example, irrigations are sometimes restricted to being applied during certain times of the day, such as from 8:00 p.m. to 6:00 a.m. This eliminates the operation of irrigation systems during the day time hours when there is likely higher indoor water use. Setting the irrigation controller to only execute an irrigation application during the evening or early morning hours should reduce the high peak water use values that would have occurred had the irrigations been executed during the daytime hours.

High peak water use values may occur on days following days with extremely hot and dry weather conditions. This occurs because higher irrigation watering amounts generally are applied on days following days with extremely hot and dry weather conditions. This is especially true with controllers that vary irrigation applications based on evapotranspiration (ET controllers). Evapotranspiration rates are closely correlated to the water requirements of plants. Evapotranspiration is the water lost by direct evaporation from the soil and plant and by transpiration from the plant surface. Potential evapotranspiration (ETo) is calculated from meteorological data and the hotter, dryer the weather conditions the higher will be the ETo readings. As ETo rates increase, due to hot, dry weather, the irrigation application watering amounts, applied by ET controllers, will also increase. If there are several ET controllers installed in a water supply area, a high peak water use value could occur on a day following a day with hot, dry weather conditions.

There are several companies that are presently marketing ET controllers or will be in the near future. Irrigation controllers that derive all or part of the irrigation schedule from potential evapotranspiration (ETo) data are discussed in U.S. Pat. No. 5,479,339 issued December 1995, to Miller, U.S. Pat. No. 5,097,861 issued March 1992 to Hopkins, et al., U.S. Pat. No. 5,023,787 issued June 1991 and U.S. Pat. No. 5,229,937 issued July 1993 both to Evelyn-Veere, U.S. Pat. No. 5,208,855, issued May 1993, to Marian, U.S. Pat. No. 5,696,671, issued December 1997, and U.S. Pat. No. 5,870,302, issued February 1999, both to Oliver and U.S. Pat. No. 6,102,061, issued August, 2000 to Addink.

Most of the above ET controllers base application durations on the previous days ETo rates. However, U.S. Pat. No. 5,208,855 discusses an ET controller that schedules irrigation application durations based on an average of the previous weeks ETo data. This generally prevents high water applications being applied on any one day but may also result in irrigations that do not meet the water requirements of the plants. This is especially true, when a cool, wet week is followed by an extremely hot, dry week.

What is needed is an irrigation management system that uses a microprocessor to automatically derive a new irrigation schedule and/or automatically control the water use of other water using devices to reduce the potential of extremely high peak water use values from occurring. Furthermore, the new irrigation schedules have to meet the water needs of the plants with very little waste of water.

SUMMARY OF THE INVENTION

The present invention provides systems and methods in which an irrigation management system reduces high peak water use values by utilizing a microprocessor disposed in an irrigation controller. The microprocessor is programmed to (a) receive peak water use information from a water supplier, (b) receive water use information at a consumer site, and (c) automatically derive a new irrigation schedule that is at least partly based on the peak water use information and the water use information. In a preferred embodiment of the present invention the information relating to peak water use may include information on a maximum threshold water requirement value, a set volume of water available for the consumer's use during a specified time period and other information that could be used by the microprocessor to automatically reduce high peak water use values.

A water supplier that transmits information related to peak water use to the microprocessor may be a municipality, water district or any other entity that supplies water to consumers. Information on water use at a consumer site may include information on prioritized landscape watering zones, maximum water to be applied during any one irrigation application and any other information on water use at the consumer site that potentially could be used by the microprocessor to automatically reduce high peak water use values.

A consumer may be a residential water user, an agricultural water user, a commercial water user or any other entity that uses water.

A microprocessor may receive peak water use information and water use information via a wired or wireless connection.

In a preferred embodiment of the present invention, a new irrigation schedule, derived by the microprocessor, may include a modification in a default irrigation frequency, a modification in a default irrigation start time(s), a reduction in a default irrigation application duration, use of a rolling-average in the determination of the new irrigation application duration, and other changes or modifications to the default irrigation schedule that will provide for a reduction in high peak water use values.

It is further contemplated that a microprocessor will display to a water user and/or third party details on a new irrigation schedule as well as information received from a water supplier.

Various objects, features, aspects, and advantages of the present invention will become more apparent from the

DETAILED DESCRIPTION

Figure 1:
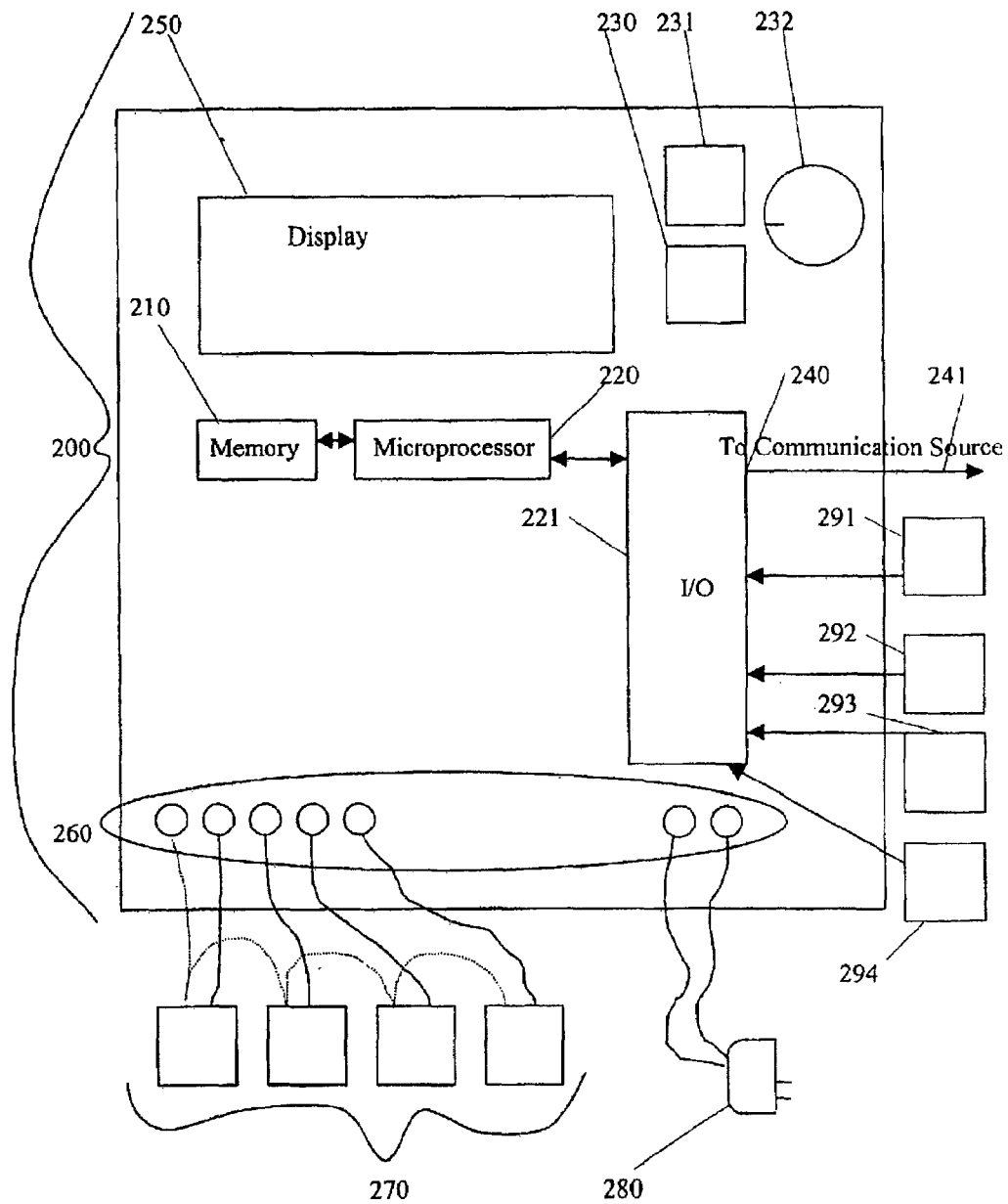
FIG. 1 is a schematic of an irrigation controller according to an aspect of the present invention.

FIG. 1 is a schematic of an irrigation controller 200 according to the present invention that generally includes a microprocessor 220, an on-board memory 210, some manual input devices 230 through 232 (buttons and/or knobs), an input/output (I/O) circuitry 221 connected in a conventional manner, a display screen 250, a communications port 240, a serial, parallel or, other communications connection 241 coupling the irrigation controller to one or more communication sources, electrical connectors 260 which are connected to a plurality of irrigation stations 270 and a power supply 280, a rain detection device 291, a flow sensor 292, a pressure sensor 293 and a temperature sensor 294. Each of these components by itself is well known in the electronic industry, with the exception of the programming of the microprocessor in accordance with the functionality set forth herein. There are hundreds of suitable chips that can be used for this purpose. At present, experimental versions have been made using a generic. Intel 80C54 chip, and it is contemplated that such a chip would be satisfactory for production models.

In a preferred embodiment of the present invention the controller has one or more common communication internal bus(es). The bus can use a common or custom protocol to communicate between devices. There are several suitable communication protocols, which can be used for this purpose: At present, experimental versions have been made using an I$^2$C serial data communication, and it is contemplated that this communication method would be satisfactory for production models. This bus is used for internal data transfer to and from the EEPROM memory, and is used for communication with personal computers, peripheral devices and measurement equipment including but not limited to utility meters, water pressure sensors, and temperature sensors.

It is contemplated that a microprocessor will be disposed in an irrigation controller. Alternatively, a microprocessor may be disposed in a personal computer or other device that not only controls an irrigation system but also provides control or monitoring of other devices at the consumer site. This is especially true with agricultural irrigation systems, where a personal computer controls the irrigation system and also controls or monitors other activities on the farm. A personal computer could also be used at large irrigation sites, commercial sites, etc. to control the irrigation system as well as used to control or monitor other activities at these sites.

Figure 2:
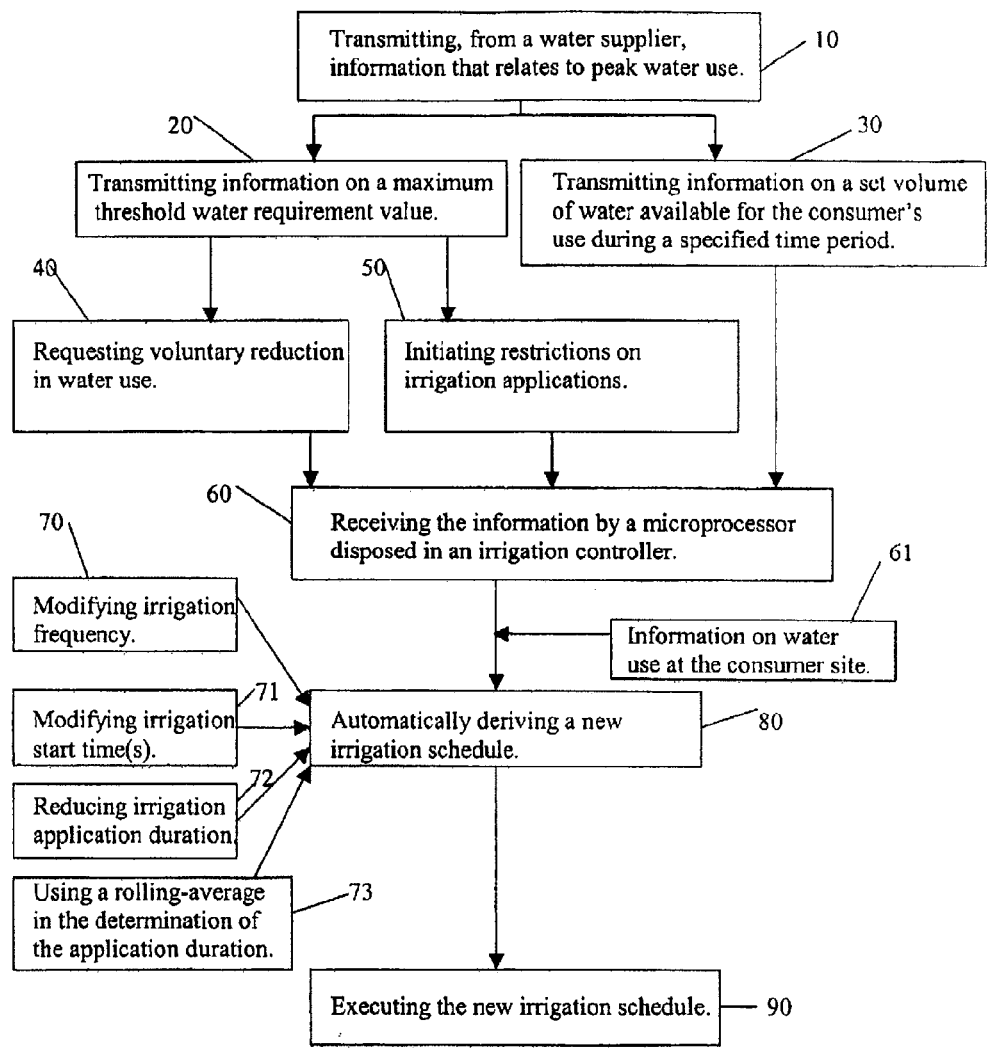
FIG. 2 is a flow chart of an irrigation management system according to the present invention.

Referring to FIG. 2, information relating to peak water use, either historical or actual is transmitted from a water supplier 10 and received by a microprocessor disposed in an irrigation controller 60. The water supplier may be a water district, municipality, or other entity that is involved in the distribution of water to consumers. The information may be received by the microprocessor via any suitable mechanism, including Internet, telephone line, radio, pager, two-way pager, cable or TV carrier wave. It is further contemplated that communication may involve two-way communications between the water supplier and the microprocessor. Two-way communication allows the water supplier to know if changes were made to water use at the consumer's site.

Peak water use, as used herein, is defined as the maximum water use that occurs over any set interval of time during a day, week, month, or other period. The set interval of time for determination of this maximum water use will generally be short, such as a one or two hour interval during a day. However, peak water use may be a determination of maximum water use over a longer interval of time, such as a.m. or p.m. hours during a period of a month, one day during a period of a month or year, or some other set interval of time. For example, peak water use may occur during the summer when irrigation application amounts are the highest.

Furthermore, peak water use probably will occur in the mornings when irrigation systems typically are operated. Specifically, peak water use may occur between the hours of 6:00 a.m. to 8:00 a.m. when irrigation systems are operating and when individuals are taking showers.

Preferably, as high peak water use values occur during the year or are projected to occur, information relating to the peak water use will be transmitted from the water supplier 10. It is further contemplated that information relating to peak water use will be transmitted-from the water supplier to the microprocessor only when water use is near a maximum threshold water requirement value 20. The maximum threshold water requirement may be based on several factors, including water available for distribution, quantity of water required to meet fire control needs, and other factors. The water available for distribution may depend on water resources and water in storage. This very, likely will change from year to year based on weather conditions. Additionally, water for distribution may depend on the water treatment facilities capacity to process water and may also depend on the size of the pipe used to deliver the water to the consumers. The maximum threshold water requirement value (maximum threshold value) will likely fluctuate from year to year as well as during the year.

Preferably, water use will not exceed the maximum threshold value to the extent that additional financial resources have to be expended to acquire new water resources and/or to increase the capacity of the water treatment facility. Reducing the highs of peak water use should reduce the likelihood that the maximum threshold value will be exceeded.

Preferably, the water supplier will only have to transmit requests for voluntary reduction in water use 40. However, in a given water supply area, even if all ET controllers were programmed to automatically derive an irrigation schedule that would provide for a reduction in water use, there will always be many other controllers in that same water supply area that do not base irrigations on ETo. Therefore, during periods when water use is near the maximum threshold value, there will be times when water use may exceed the maximum threshold value, especially if drought conditions occur that reduce the water available for distribution. This may also result in the water supplier lowering the maximum threshold value. It is contemplated that when water use exceeds the maximum threshold value that the water supplier would initiate some restrictions on irrigation applications 50.

Other information may be transmitted to the microprocessor, such as a set volume of water available for the consumer's use during a specified time period 30. The volume of water may be based on historical water use by the consumer. Alternatively, it may be based on demographic characteristics of the water user, such as, household numbers, or on lot size, acres farmed; average water used during a specific manufacturing process, and so forth. Since most water use is measured on a monthly basis, it is contemplated that the specified time period would be for a month. However, the specified time period may be more or less than a month depending on when the measurement of water use at the consumer's site is done.

Additionally, other information may be transmitted to the microprocessor from the water supplier including specific information on restrictions on other water uses, such as, no hosing of driveways and sidewalks, no washing of cars, etc. There may be transmission of information on steps to take to reduce water consumption both indoors and outdoors, and other information that could be useful in reducing the high peak water use value.

The microprocessor receives the information 60 and automatically derives a new irrigation schedule 80 based partially on the information received that relates to peak water use 10 and may also use information on water use at the consumer's site 61. Automatically, as used herein, means without human interaction. Additionally, it is contemplated that the new irrigation schedules will be based at least partly on ETo data.

It is contemplated that the information on water use at the consumer's site 61 will be inputted by the consumer at the irrigation site. Alternatively, the information may be inputted into the irrigation controller at the factory, at the distribution center, or another location prior to the installation of the controller at the consumer's site.

Information on water use at the consumer's site may include information on prioritized landscape watering zones. For example, a higher priority may be put on landscape zones where flowers are grown than where grass is grown. If a reduction in watering has to be made the consumer would rather have the reduction in watering occur when irrigation applications are being made to the lawn than when irrigation applications are being made to the flowers. Alternatively or additionally, the information may include information on the maximum water to be applied during any one irrigation application and/or information on preferred irrigation start times. For example, the consumer's first preference may be watering start times of 6:00 a.m., second preference 4:00 a.m., third preference 1:00 a.m., and so forth. If a period of peak water use occurs during the highest consumer's preference time, then irrigation start times will occur during the next highest preferential time.

It is further contemplated that information on historical water use data may be inputted into the irrigation controller. When there is a set volume of water to be used at a consumer site 30 the microprocessor, based on historical water use data, can automatically determine a percent reduction in an irrigation application duration 72 that likely would result in water use closely approximating the set volume of water to be used during the specified period of time. Additionally, information on other water using devices at the consumer site may be inputted into the irrigation controller, especially information on water using devices in manufacturing processes.

It is contemplated that the information on water use at the consumer site and also the information relating to peak water use may be in some type of a coded format. Although coded information would not be an absolute necessity, it is preferred, since the microprocessor will use the coded information to automatically derive a new irrigation schedule. Preferably, at the time the microprocessor derives a new irrigation schedule, there will be no requirement for the consumer to make any changes to the irrigation controller's settings. The code(s) entered may be taken from a printed manual supplied with the controller, or from some other source such as an internet website, or provided by a telephone operator.

Referring again to FIG. 2, the newly derived irrigation schedule 80 may include modifications in the default irrigation frequency 70, modifications in the default irrigation start time(s) 71, reductions to the default irrigation application duration 72, and/or the use of a rolling-average in the determination of the new irrigation application duration 73. After the microprocessor derives a new irrigation schedule 80, the microprocessor will execute the new irrigation schedule 90.

Irrigation application durations based on a rolling-average 73 reduce the potential of extremely high peak water use from occurring. This is especially important with ET controllers whose application rates are based on ETo data. As mentioned earlier, the hotter and dryer the weather the higher the ETo value that will result in higher application rates being applied during an irrigation following a hot, dry day. This could also result in a high peak water use value occurring. Using a rolling-average reduces the potential of high peak water use values from occurring because the irrigation application durations are averaged over several days. For example, assume the daily irrigation application duration, without a rolling-average, would have been 20, 24, 18, 22, 36, 20, 22 minutes for Sunday, Monday, Tuesday, Wednesday, Thursday, Friday, and Saturday, respectively. Using a three day rolling average, the daily irrigation application duration for Tuesday, Wednesday, Thursday, Friday, and Saturday would have been, 21, 21, 25, 26, and 26 minutes, respectively. Without a rolling-average the irrigation application duration would have been 36 minutes on Thursday (the day after a hot, dry day) however, with a rolling-average the irrigation application duration was 25 minutes, which is a significant) decrease in the watering duration.

Preferably, the triggering mechanism that initiates the use of the rolling-average would be information transmitted from the water supplier that water use was near the maximum threshold value. Alternatively, the rolling-average triggering mechanism could be when the irrigation watering duration exceeded a maximum duration time or any other triggering mechanism that would trigger the activation of the use of the rolling-average and potentially reduce a high peak water use value. Additionally, it is preferred that the rolling-average be based on seven consecutive application times but it can be a number of application times more or less than seven.

Figure 3:
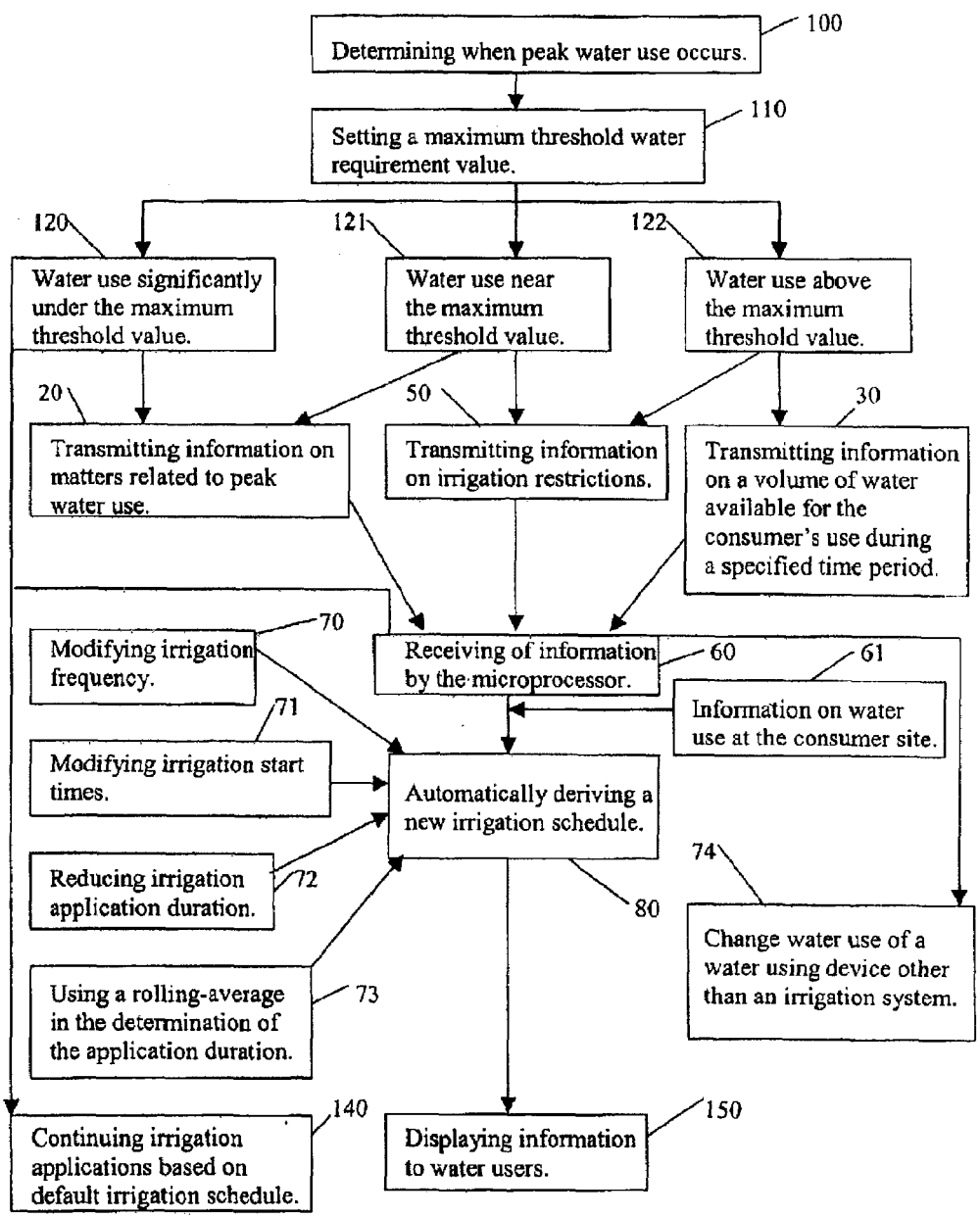
FIG. 3 is a flow chart of possible irrigation management system results based on information received from a water supplier.

FIG. 3 is a flow chart of possible irrigation management results based on information received from a water supplier, relating to peak water use and information received on water use at a consumer site. In a preferred embodiment, the water supplier will first determine when peak water use potentially might occur based on historical water use data 100. The water supplier will then determine and set a value for the maximum threshold water requirement 110. In a preferred embodiment of the present invention, the water supplier will base transmitted information on, comparisons between actual water use and maximum threshold values. For example, if the actual water use is significantly under the maximum threshold value 120 then either no information will be transmitted or just a brief message will be transmitted indicating when peak water use could potentially occur during that time of the year. It is contemplated that when the microprocessor receives the information 60, there will be no derived new irrigation schedule and instead the microprocessor will continue to execute the default irrigation schedule 140. Preferably, the default irrigation schedule is based at least partly on ETo data.

Referring again to FIG. 3, if the water use is near the maximum threshold value 121, the water supplier may transmit a slightly stronger worded message that includes a recommendation that the consumer take steps to reduce water use during the period of peak water use. It is further contemplated that restrictions on irrigations maybe imposed 50. When the microprocessor receives the information 60, the microprocessor preferably will derive a new irrigation schedule 80. The new irrigation schedule will be at least partly based on information received from the water supplier 20, 30 and/or 50 and may be influenced by received information on water use at the consumer's site 61. The new irrigation schedule may include anyone of the following: a modification in the default irrigation frequency 70, a modification in the default irrigation start time(s) 71, a reduction in the default irrigation application duration 72, and/or the 20 use of a rolling-average in the determination of the new irrigation application duration 73. Although, it is contemplated that when actual water use is near the maximum threshold value 121 that a derived new irrigation schedule 80 will likely involve a modification in irrigation start times 71. This would involve changing the start times so watering does not occur during the periods of peak water use.

Alternatively, if the period of peak water use occurs only on certain days, then either start times 71 or frequency of applications 70 could be modified. For example, if watering was being done every day and peak water use occurred on Tuesdays between 6:00 a.m. and 8:00 a.m., then the frequency of irrigations 70 could be modified to every day excluding Tuesday. It Is also contemplated that a rolling-average could be used 73, especially with ET controllers, to reduce extremely high irrigation application durations following a day of hot, dry weather.

It is also contemplated that no new irrigation schedule will be derived when the actual water use nears the maximum threshold value 121. Instead, the default irrigation schedule 140 will be executed and water use of another water using device will be modified 74. For example, instead of deriving a new irrigation schedule 80, a change may be made to the water used by some other water-using device 74, such as a water-using device in a manufacturing process. As mentioned above, the microprocessor will base the automatic derivation of a new irrigation schedule on information received from the water supplier and may base it partly on information received on water use at the consumer's site 61. If the time of operation of a manufacturing water using device can be changed with no affect on its operation, then a change in the start times of the manufacturing water using device 74 may be preferred to a change in the start times of the irrigation system 71 at the manufacturing site.

In a preferred embodiment of the present invention, if the actual water use is above the threshold water requirement value 122, the water supplier will likely issue restrictions on water use 50. The restrictions may only apply to start times of irrigation systems 71. Alternatively, it may involve a reduction in water use 72 or limiting of the water used by a consumer to a set volume of water during a specified period of time 30. The microprocessor will automatically derive a new irrigation schedule 80 based at least in part on the restrictions and other received information from the water supplier and may also base it on information received on water use at the consumer's site.

The water supplier may also issue restrictions on other outdoor water uses, such as, hosing of driveways and sidewalks and washing of cars. It is contemplated that the microprocessor will display information on restrictions to the water user. Additionally, the microprocessor may display, to the water user, information on the modifications that were made to the default irrigation schedule 150. Some or all of the information displayed to the water user may be displayed to third parties. Additionally, it is contemplated that information on the new irrigation schedule will be displayed to the water supplier via two-way communications. Displays can be any reasonable size, shape, composition, and so forth. Display 250, disposed in the irrigation controller, in FIG. 1 is a few inches on a side, and is an LED or liquid crystal type display.

Alternatively, displays may be located away from the irrigation controller, such as in a personal computer. Some irrigation systems don't use automatic irrigation controllers, such as, agricultural irrigation systems and therefore the display would likely be located in a personal computer. It is also contemplated that the information may be communicated to the consumer through means other than liquid crystal type displays, such as through printed material, audible messages, such as via a telephone system or any other suitable means that would communicate the information to the consumer.

Thus, specific embodiments and applications of irrigation management systems used to reduce peak water use have been disclosed. It should be apparent, however, to those skilled in the art that many more modifications besides those already described are possible without departing from the inventive concepts herein. The inventive subject matter, therefore, is not to be restricted except in the spirit of the appended claims.

What is claimed is:

1. An irrigation management system comprising a microprocessor disposed in an irrigation controller that is programmed to:
   (a) receive, from a water supplier, information relating to peak water use;
   (b) receive information on water use at a consumer site;
   (c) automatically derive a new irrigation schedule that is at least partly based on both the peak water use and the water use at the consumer site; and
   (d) execute the new irrigation schedule.

2. The irrigation management system of claim 1, wherein the peak water use information comprises a maximum threshold water requirement value.

3. The irrigation management system of claim 1, wherein the peak water use information comprises a set volume of water available for the consumer's use during a specified time period.

4. The irrigation management system of claim 1, wherein the water supplier is a municipality.

5. The irrigation management system of claim 1, wherein the water supplier is a water district.

6. The irrigation management system of claim 1, wherein the water use information at the consumer site comprises prioritizing landscape watering zones.

7. The irrigation management system of claim 1, wherein the information on water use at the consumer site comprises a maximum volume of water to be applied during any one irrigation application.

8. The irrigation management system of claim 1, wherein a consumer at the consumer site is a residential water user.

9. The irrigation management system of claim 1, wherein a consumer at the consumer site is an agricultural water user.

10. The irrigation management system of claim 1, wherein a consumer at the consumer site is a commercial water user.

11. The irrigation management system of claim 1, wherein both the peak water use information and the water use at the consumer site are received via a wired connection.

12. The irrigation management system of claim 1, wherein both the peak water use information and the water use at the consumer site are received via a wireless connection.

13. The irrigation management system of claim 1, wherein the new irrigation schedule comprises a modification in a default irrigation frequency.

14. The irrigation management system of claim 1, wherein the new irrigation schedule comprises a modification in a default irrigation start time(s).

15. The irrigation management system of claim 1, wherein the new irrigation schedule comprises a reduction in a default irrigation application duration.

16. The irrigation management system of claim 1, wherein the new irrigation schedule comprises the use of a rolling-average in the determination of a new irrigation application duration.

17. The irrigation management system of claim 1, wherein the microprocessor is further programmed to display details of the new irrigation schedule and the peak water use information to a water user and a third party.

* * * * *